(12) United States Patent
Neet

(10) Patent No.: US 7,808,148 B2
(45) Date of Patent: Oct. 5, 2010

(54) STATOR WINDING ASSEMBLY AND METHOD

(75) Inventor: Kirk Neet, Pendleton, IN (US)

(73) Assignee: Remy International, Anderson, IN (US)

( * ) Notice: Subject to any disclaimer, the term of this patent is extended or adjusted under 35 U.S.C. 154(b) by 411 days.

(21) Appl. No.: 11/853,177

(22) Filed: Sep. 11, 2007

(65) Prior Publication Data
US 2009/0066182 A1 Mar. 12, 2009

(51) Int. Cl.
*H02K 3/48* (2006.01)
(52) U.S. Cl. .................... 310/216.069; 310/214
(58) Field of Classification Search .......... 310/208, 310/214, 216.067, 216.069, 216.071, 216.072, 310/216.073
See application file for complete search history.

(56) References Cited

U.S. PATENT DOCUMENTS

| 1,300,308 | A | * | 4/1919 | Walker ................... 363/150 |
| 2,858,462 | A | * | 10/1958 | Knaus ................... 310/214 |
| 4,392,072 | A | * | 7/1983 | Rosenberry .......... 310/216.067 |
| 5,723,930 | A |   | 3/1998 | Ho et al. |
| 6,057,624 | A | * | 5/2000 | Ohtake et al. ............ 310/214 |
| 6,710,496 | B2 | * | 3/2004 | Fujita et al. ................ 310/201 |
| 6,713,928 | B2 | * | 3/2004 | Takizawa et al. ........... 310/214 |
| 6,949,857 | B2 | * | 9/2005 | Neet et al. .................. 310/214 |
| 7,098,567 | B2 |   | 8/2006 | Ionel et al. |
| 7,143,503 | B2 |   | 12/2006 | Ionel et al. |
| 7,183,687 | B2 |   | 2/2007 | Ionel et al. |
| 2003/0033709 | A1 |   | 2/2003 | Bradfield |
| 2006/0208595 | A1 |   | 9/2006 | Bradfield |

* cited by examiner

*Primary Examiner*—Dang D Le
(74) *Attorney, Agent, or Firm*—Cantor Colburn LLP

(57) ABSTRACT

Disclosed herein is an electric machine stator. The electric machine stator includes a tubular body with a plurality of radial slots formed into a perimetrical surface thereof, each of the plurality of slots having a width that varies over at least a portion of a radial depth of the slot such that the slot width is narrower near the perimetrical surface than the slot width further from the perimetrical surface. The stator further includes at least one winding positioned within each of the plurality of slots and at least one of the at least one winding is deformed within the slot such that at least one dimension of the at least one winding is greater than a narrowest slot width dimension thereby retaining the winding within the slot.

11 Claims, 4 Drawing Sheets

STATOR WINDING ASSEMBLY AND METHOD

BACKGROUND OF THE INVENTION

Electric machines such as alternators typically utilize stators that have a plurality of slots therein within which conductive windings are positioned. Current flowing through the windings during operation of the machine generates magnetic fields that facilitate the machine's conversion of mechanical energy into electrical energy or vice versa. Maintaining the windings within the slots is important for reliable operation of the alternator. Varnishes are typically applied to the windings or the slots that, once hardened, adhesively bond the windings to the stator. Application of the varnish is a difficult process that requires care in assuring that the windings are properly bound to the stator. When the varnish is not applied properly the windings can be inadequately retained resulting in premature failure of the electric machine.

As such the industry is receptive of more robust designs and processes to retain windings to stators.

BRIEF DESCRIPTION OF THE INVENTION

Disclosed herein is an electric machine stator. The electric machine stator includes a tubular body with a plurality of radial slots formed into a perimetrical surface thereof, each of the plurality of slots having a width that varies over at least a portion of a radial depth of the slot such that the slot width is narrower near the perimetrical surface than the slot width further from the perimetrical surface. The stator further includes at least one winding positioned within each of the plurality of slots and at least one of the at least one winding is deformed within the slot such that at least one dimension of the at least one winding is greater than a narrowest slot width dimension thereby retaining the winding within the slot.

Further disclosed herein is a stator winding retention method. The method includes, varying widths of a plurality of slots formed in a perimetrical surface of a stator over a radial depth of each of the plurality of slots from the perimetrical surface such that the width is narrowest near the perimetrical surface, positioning at least one winding within each of the plurality of slots, deforming at least one portion of the at least one winding such that the at least one deformed portion has a dimension greater than the narrowest width, and retaining the at least one winding within the slot within which it is positioned through interference of the at least one deformed portion and the narrowest width.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of an embodiment of the disclosed apparatus and method are presented herein by way of exemplification and not limitation with reference to the Figures.

Figure 1:
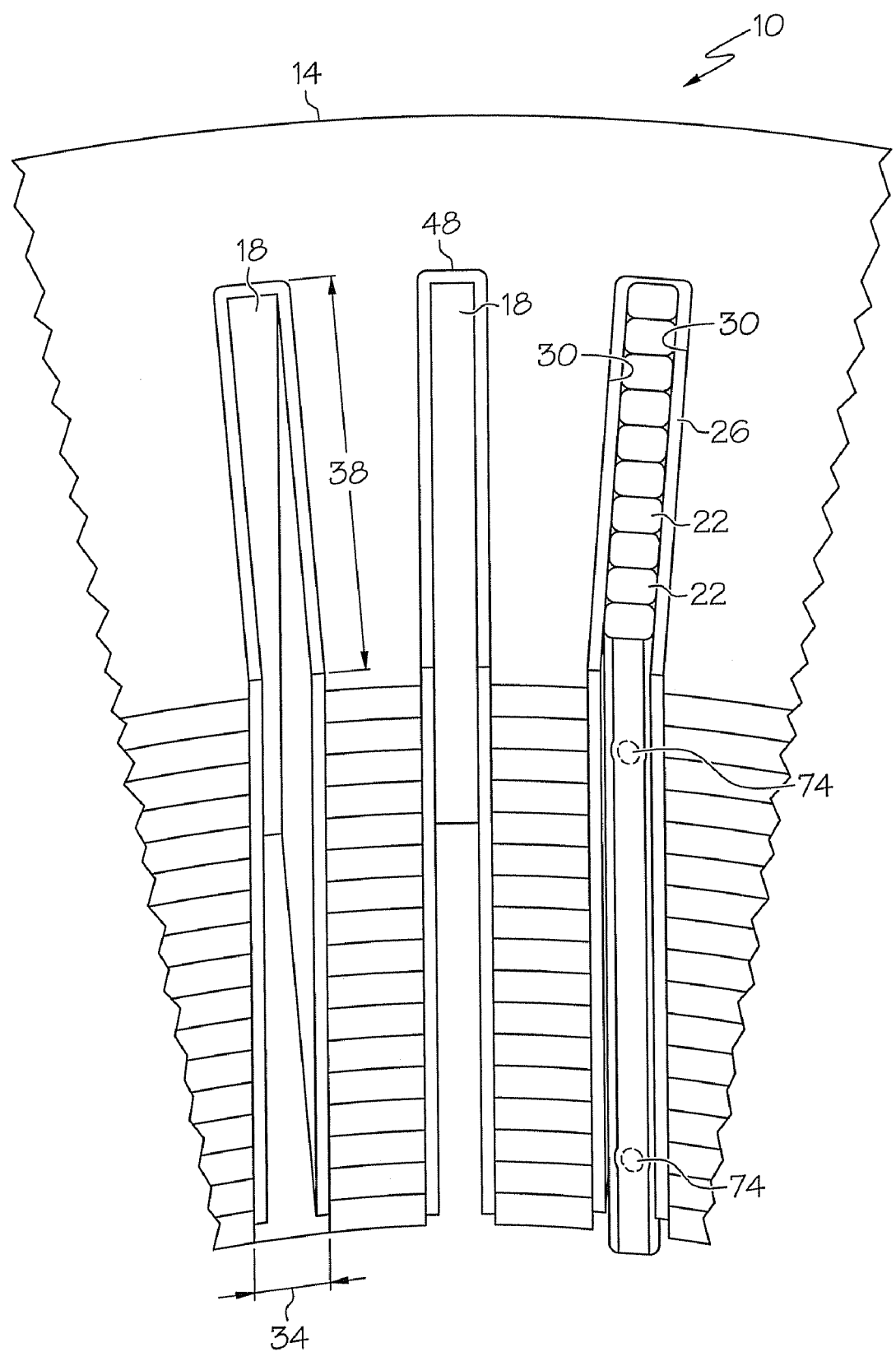
FIG. 1 depicts a partial perspective view of a stator assembly disclosed herein.

Referring to FIG. 1, an embodiment of the stator and winding assembly 10 disclosed herein is illustrated. The assembly 10 includes a stator 14 having a tubular body with a plurality of slots 18, having a perimetrical width and a radial depth, formed therein, and a plurality of windings 22, with rectangular cross sections in this embodiment, positioned within each of the plurality of slots 18. The stator 14 is constructed from a plurality of stacked and attached laminations or a solid powdered metal body, for example. In addition to insulation (not shown) coating the conductors of the windings 22 themselves, an optional insulation 26 can be used between the windings 22 and walls 30 of the slots 18 to minimize the possibility of electrically shorting the windings 22 with the stator 14. Thin nonconductive materials such as paper or plastic are good candidates for usage in the insulation 26. Regardless of which insulation material is utilized it is important to maintain the windings 22 within the slots 18 for proper operation of the electric machine.

Figure 2:
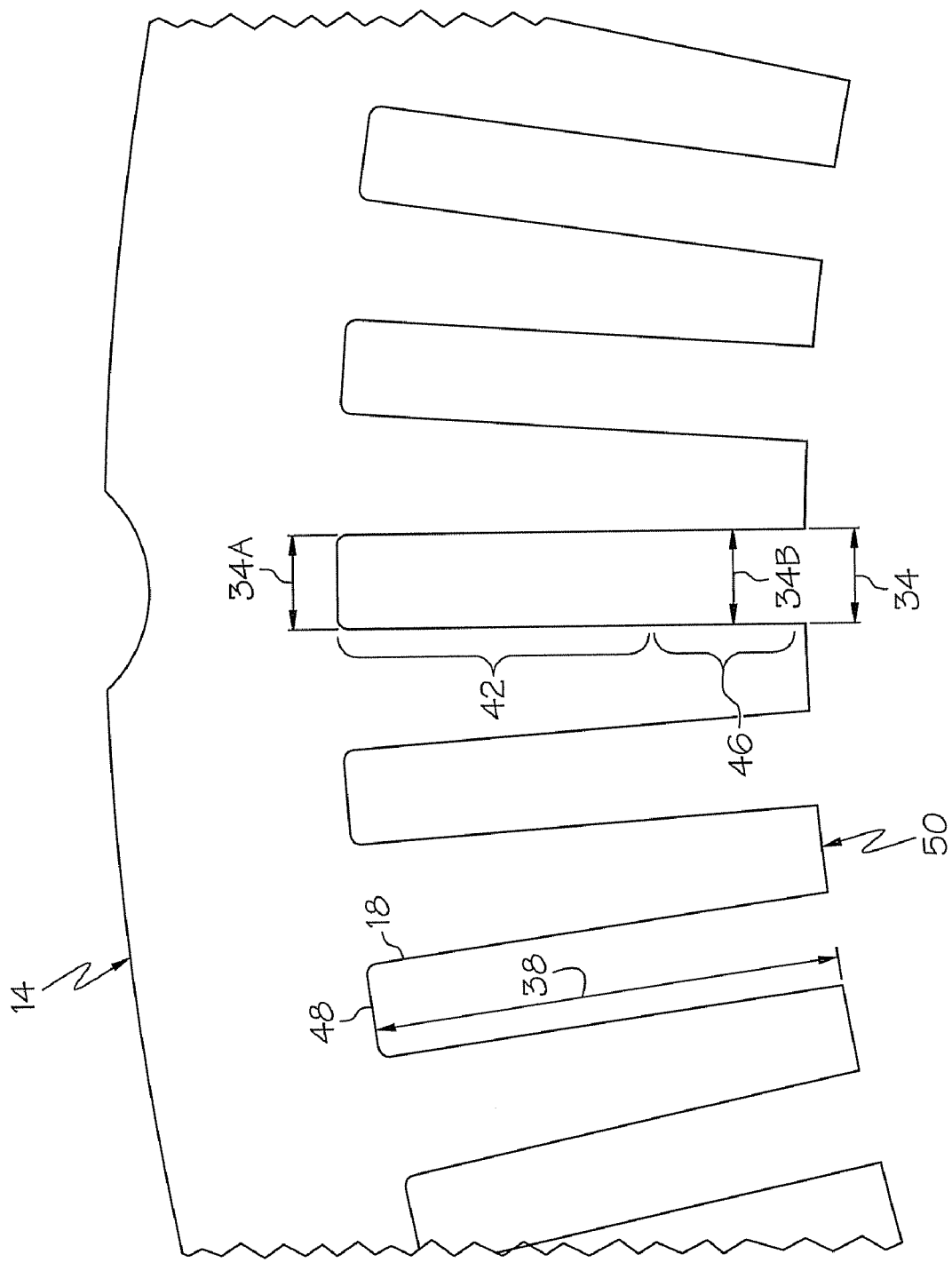
FIG. 2 depicts a partial plan view of a stator core used in the stator assembly of FIG. 1.

Referring to FIG. 2, the perimetrical width 34 of the slots 18 disclosed herein varies over the radial depth 38 of the slots 18. More specifically, in one embodiment, the slots 18 are divided into a first portion 42 with a first width 34A and a second portion 46 with a second width 34B. The first portion 42 is positioned toward a closed end 48 of the slot 18 furthest from a perimetrical surface 50 from which the slots 18 originate, while the second portion 46 is positioned between the first portion 42 and the perimetrical surface 50. By setting the first width 34A at a constant width and having the second width 34B vary gradually to be narrowest near the perimetrical surface 50, a frictional engagement between the windings and the second width 34B can be established. Such a frictional engagement of the windings 22 with the slots 18 can be used to retain the windings 22 within the slots 18. In a case wherein the optional insulation 26 is used, an accounting for the additional thickness of the two layers of insulation 26, one on each side of the slot 18, will need to be made. Additional care will also be required during installation of the windings 22 to the slots 18 to assure damage to both layers of insulations 26 (and the winding insulation itself) does not compromise the electrical isolation provided thereby. It should also be noted that although the embodiment disclosed herein has a gradually varying slot width 34, alternate embodiments could have slot widths that vary abruptly such as in a step or even multiple steps.

Figure 3:
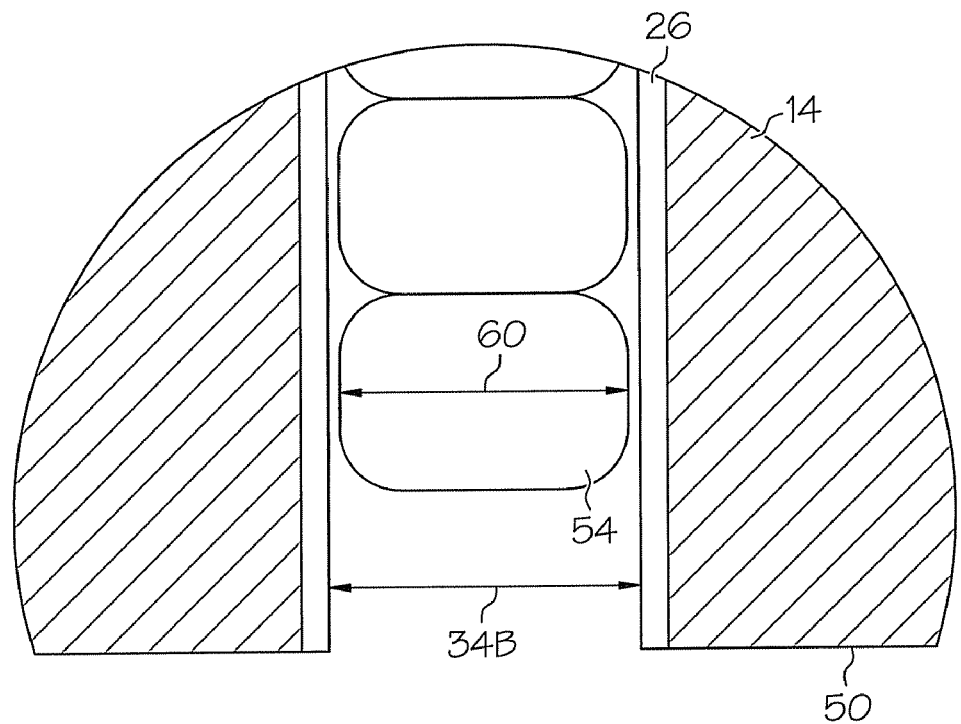
FIG. 3 depicts a magnified view of a stator and winding interface disclosed herein prior to widening of the winding.
Figure 4:
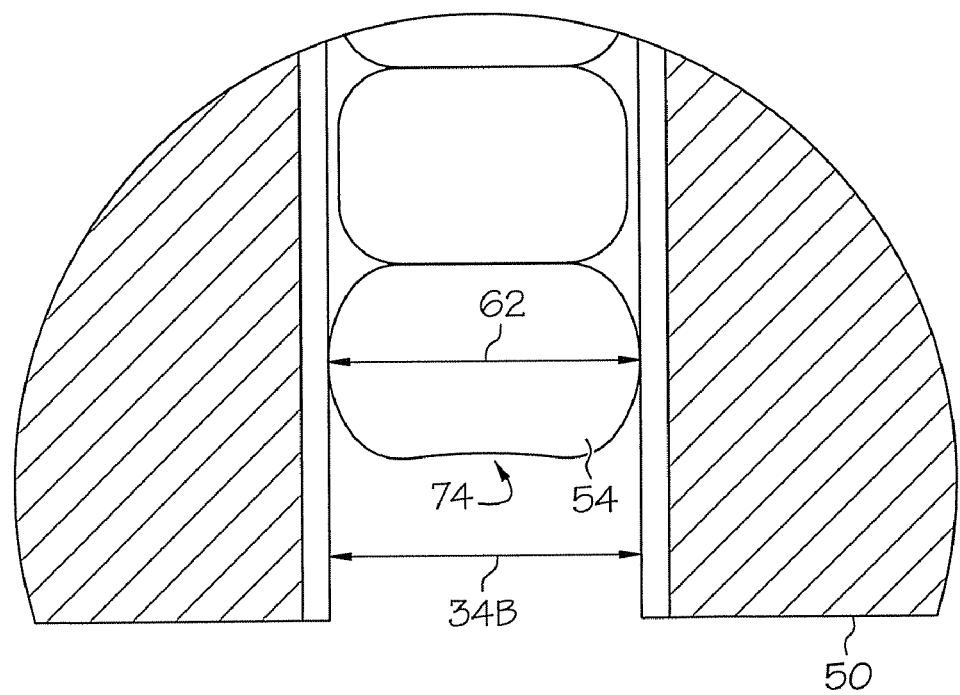
FIG. 4 depicts the magnified view of a stator and winding interface of FIG. 3 after widening of the winding.

Referring to FIGS. 3 and 4, additional retention of the windings 22 within the slots 18 can be achieved by increasing the frictional engagement between the windings 22 and the walls 30. In this embodiment increasing a width of specific wires 54 of the windings 22 increases the frictional engagement. This is accomplished in this embodiment by increasing a wire width from an as installed width 60 to a widened width 62 as shown in FIGS. 3 and 4 respectively. Thus, by setting the widened width 62 to a desired dimension greater than the second width 34B the interference between the wire 54 and the second portion 46 of the slot 18 can be controlled. Further, by controlling the level of interference, the frictional force between the wire 54 and the slot 18 can be controlled to levels necessary to prevent the windings 22 from dislodging from the slots 18 during usage of the electric machine.

Figure 5:
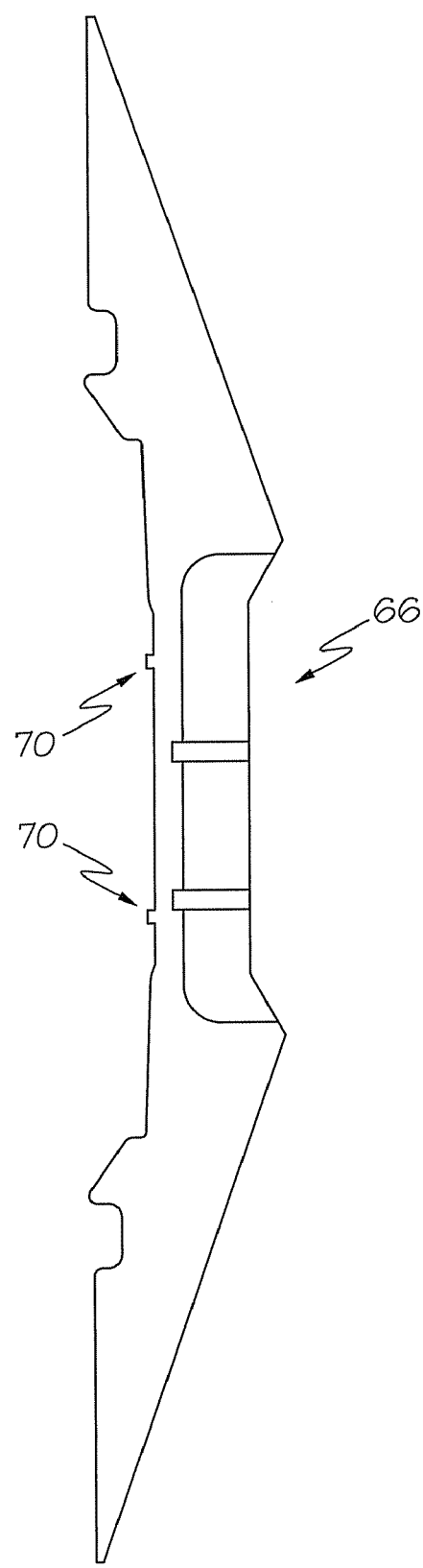
FIG. 5 depicts a winding widening tool disclosed herein.

Referring to FIG. 5, an operational step to widen the wires 54 can be performed after the wires 54 have been installed within the slots 18. Doing so allows the wires 54 to be installed while the wires 54 have the width 60 and are more easily installed within the slots 18. After all the wires 54 are positioned within the slots 18, a coining tool 66 with one or more coining nubs 70 can be pressed radially outwardly against the radially innermost (illustrated embodiment) wire 54 of the winding 22 and thereby coin the wire 54 adding indentations 74 (FIGS. 1 and 3) in the process. The indentions 74 cause a local widening of the wire 54 to the widened width 62.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine stator, comprising:
    a tubular body with a plurality of radial slots formed into a perimetrical surface thereof, each of the plurality of slots having a width that varies over at least a portion of a radial depth of the slot, the slot width being narrower near the perimetrical surface than the slot width further from the perimetrical surface; and
    at least one winding positioned within each of the plurality of slots, at least one of the at least one winding being deformed within the slot such that at least one dimension of the at least one winding is greater than a narrowest slot width dimension thereby retaining the winding within the slot.

2. The electric machine stator of claim 1, wherein the at least one winding has a rectangular cross section.

3. The electric machine stator of claim 1, wherein the perimetrical surface is a radially inwardly facing surface of the tubular body.

4. The electric machine stator of claim 1, wherein the perimetrical surface is cylindrical.

5. The electric machine stator of claim 1, wherein the tubular body is constructed of laminations.

6. The electric machine stator of claim 1, wherein the tubular body is constructed of powdered metal.

7. The electric machine stator of claim 1, wherein the slot width varies gradually over the portion of the radial depth of the slot.

8. The electric machine stator of claim 1, wherein the slot width varies in at least one step over the radial depth of the slot.

9. The electric machine stator of claim 1, wherein the at least one winding is deformed in at least two locations.

10. The electric machine stator of claim 1, further comprising at least one layer of insulation, the at least one layer of insulation lining interior surfaces of each of the plurality of slots.

11. The electric machine stator of claim 10, wherein the slot widths are measured relative to the at least one layer of insulation.

* * * * *